Patented Mar. 22, 1927.

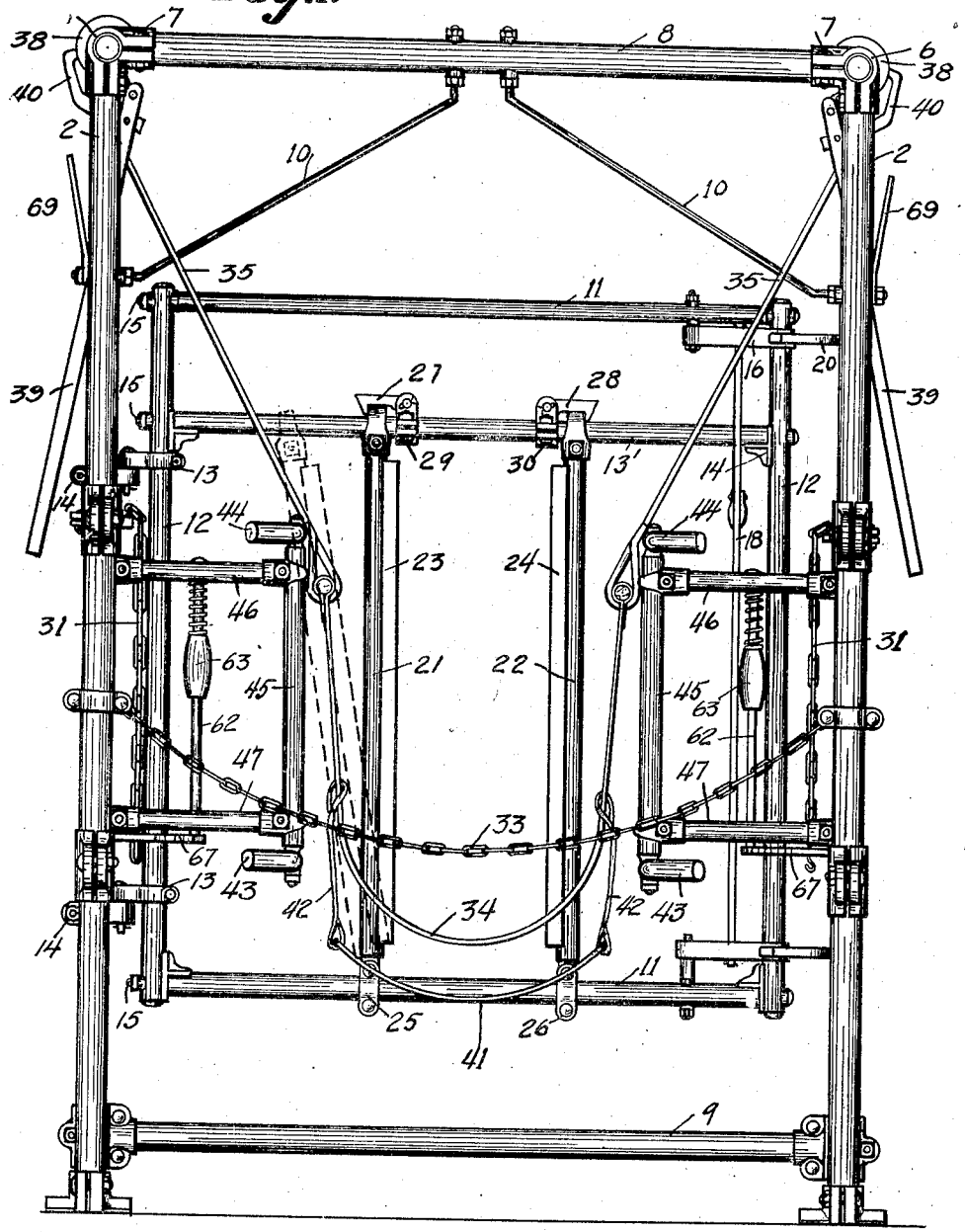

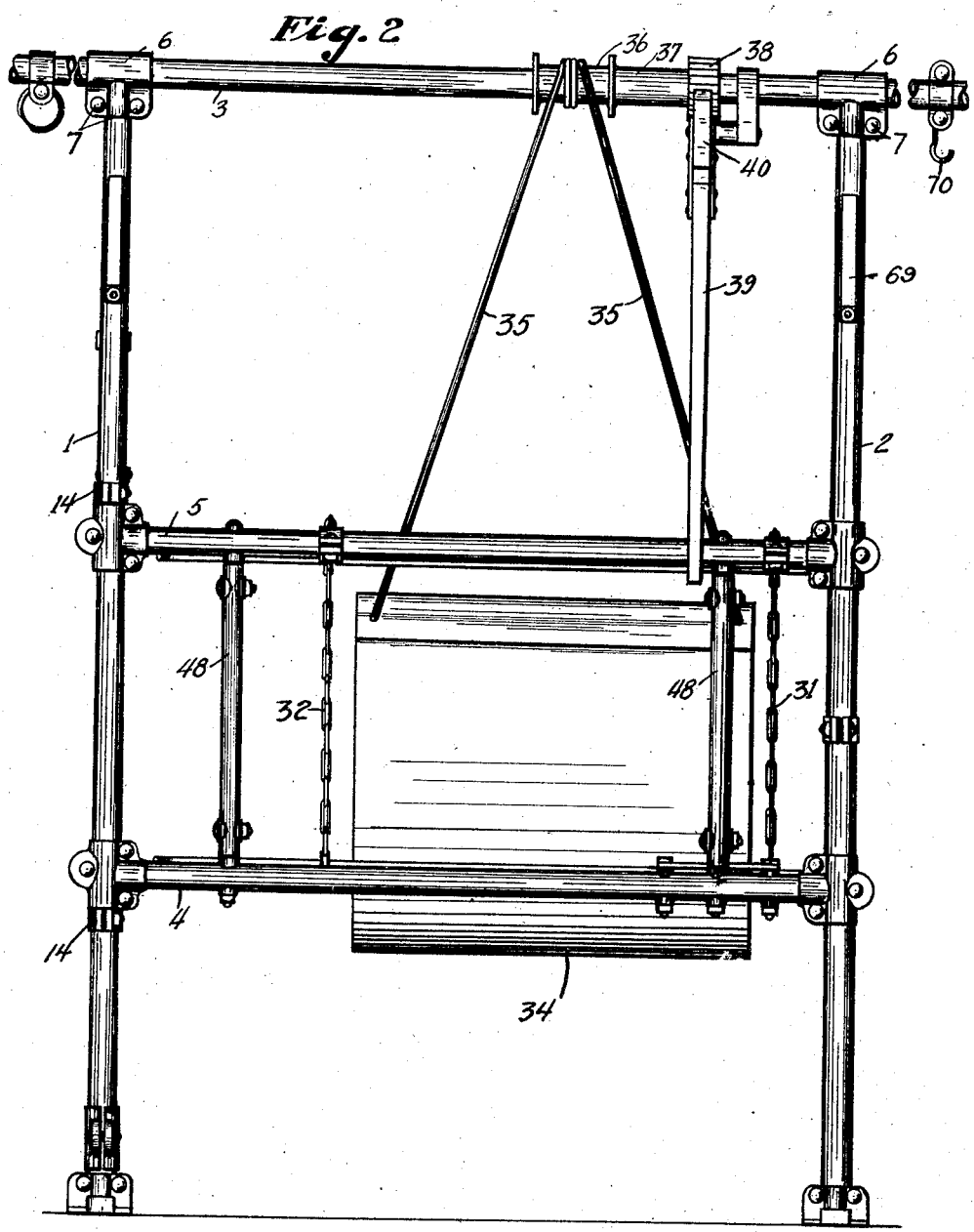

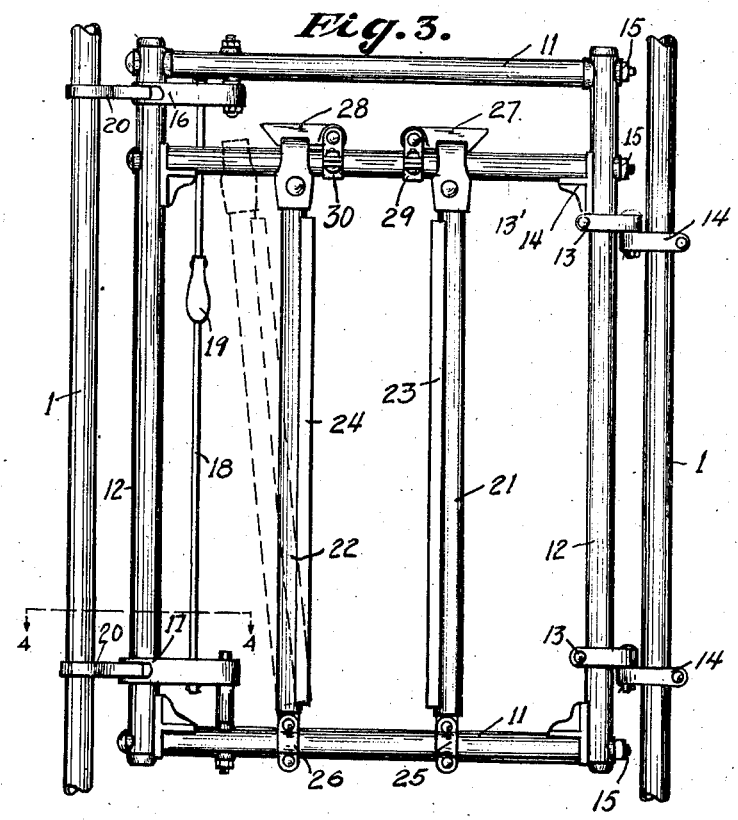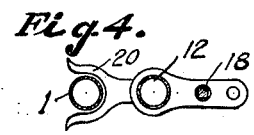

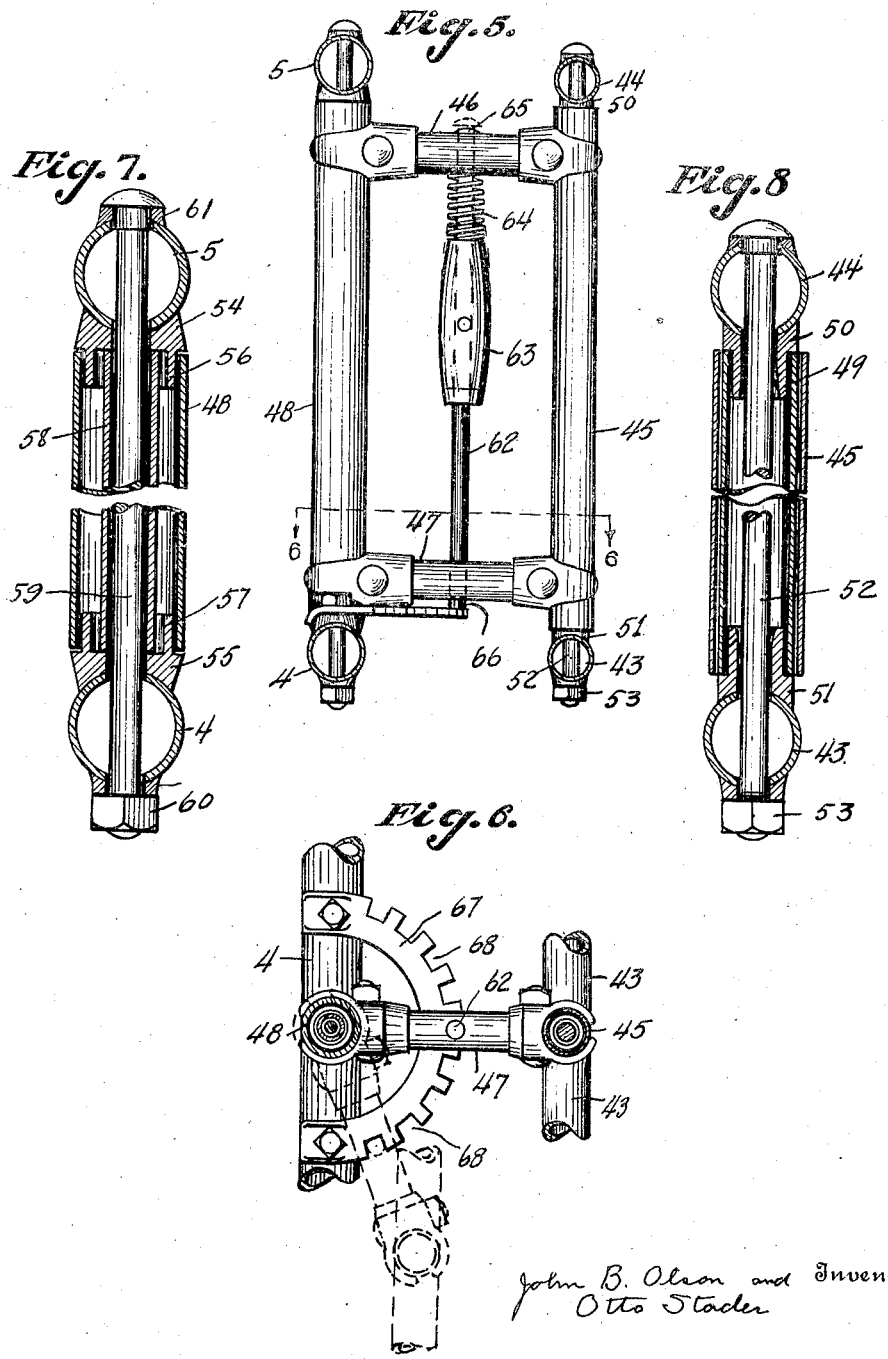

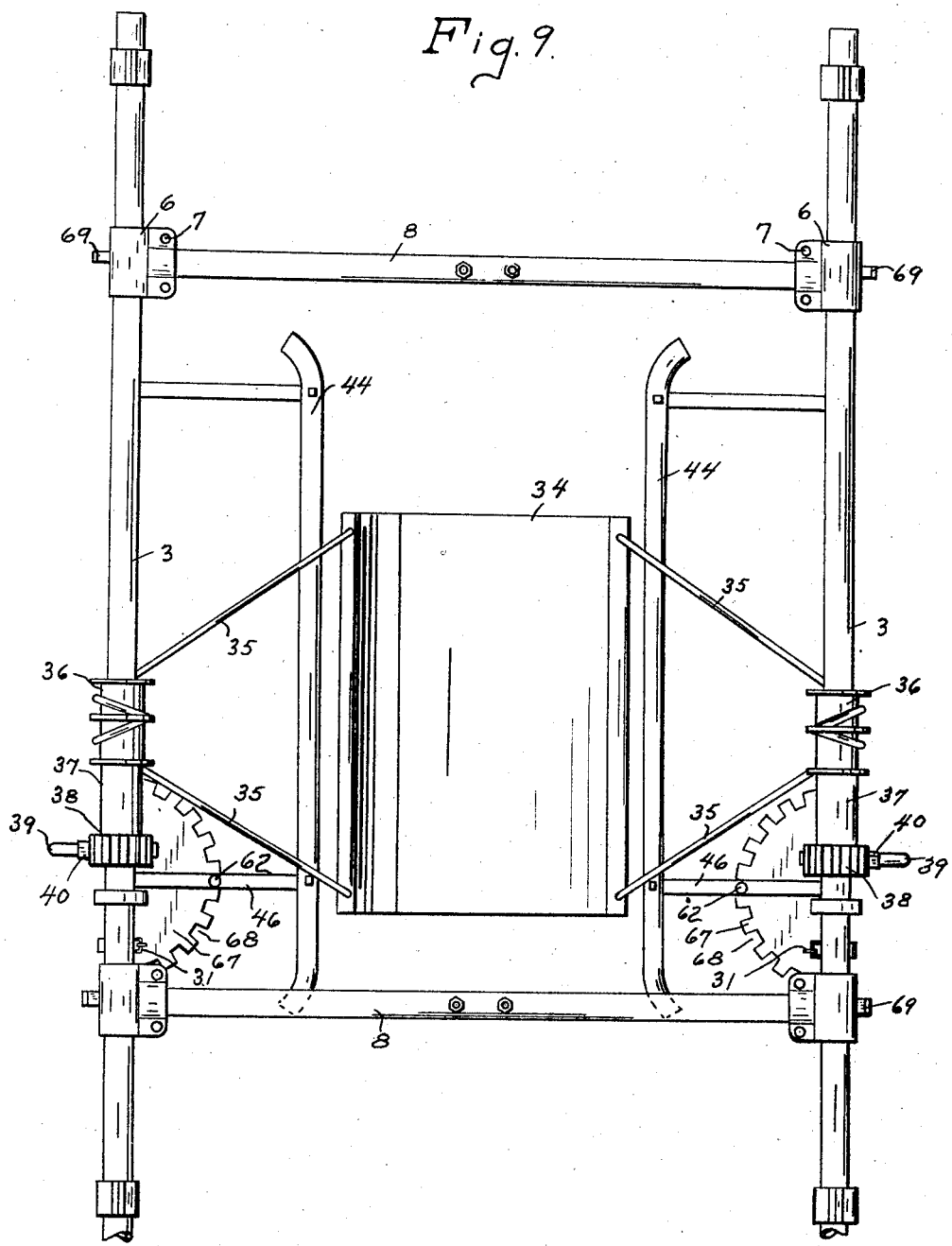

1,621,760

UNITED STATES PATENT OFFICE.

OTTO STADER AND JOHN B. OLSON, OF FORT ATKINSON, WISCONSIN, ASSIGNORS TO JAMES MANUFACTURING COMPANY, OF FORT ATKINSON, WISCONSIN, A CORPORATION OF WISCONSIN.

OPERATING STALL FOR ANIMALS.

Application filed August 24, 1921. Serial No. 495,086.

This invention relates to operating stalls for animals, such as cattle and horses the weight and strength of which have heretofore made such operations difficult.

A primary object of this invention is to provide an operating stall in which the animal may be securely held for certain classes of operations in a standing position with its weight wholly or partially supported upon its legs and the position of its internal organs normal, and in which for other operations the animal may be wholly lifted from the floor and held with the same security.

Further objects of this invention are to provide an operating stall in which access to the animal may be had from all sides, the areas obstructed by the stall frame and holding devices being reduced to a minimum,— to provide a portable stall which may be moved from place to place as occasion may require,—to provide a stall peculiarly adapted to meet the requirements of animal surgery,—and to provide for releasing the animal thru the front end of a stall notwithstanding the use of a stanchion at that end.

More specific objects are to provide an operating stall in which adjustable and normally retracted side clamps are so associated with the rigid frame of the stall that they may be readily moved inwardly and positioned and locked to hold the animal against lateral movement after it has entered the stall,—in which the front of the stall is provided with a hinged and releasably locked gate equipped with a stanchion whereby the animal may not only be released from the stanchion, but allowed to pass forwardly out of the stall thru the gate when opened,— and in which a readily and easily operated hoisting apparatus is provided.

An embodiment of the invention is shown in the accompanying drawings, in which:—

Figure 1 is a rear end elevation of the stall.

Figure 2 is a side elevation thereof.

Figure 3 is a front elevation of the end gate showing a portion of the framework of the stall.

Figure 4 is a section on the line 4—4 of Figure 3.

Figure 5 is an elevation of one of the hinges for the side clamps.

Figure 6 is a section on the line 6—6 of Figure 5, showing the adjustable locking means controlling the position of the side clamps.

Figure 7 is a vertical sectional view of the part of the hinge at the point it joins the side framework.

Figure 8 is a corresponding sectional view of the hinge at the point it joins the side clamps.

Figure 9 is a top plan view of the stall.

The stall comprises a pair of side frames, each including upright front and rear standards 1 and 2, joined by an upper longitudinal member 3, a lower member 4, and an intermediate member 5, the members 4 and 5 being arranged approximately adjacent the body of the cow or animal to be operated upon. These uprights and side members preferably comprise tubular bars which may be joined by a series of clamps 6, including inner and outer members, as indicated in Figure 1, secured by means of bolts or similar fastenings 7. The rear upright members 2 are free of any connection across their lower ends, but are joined by an upper member 8. The front uprights are joined by a member corresponding to the member 8, and by the lower member 9, this member 9 being spaced a very small distance upwardly from the floor. Diagonal bracing rods 10 may conveniently be positioned between the transverse members 8 and the vertical standards to thereby increase the stiffness of the apparatus. The transverse member 8 and braces 10 at the front of the stall correspond exactly in position and structure to the corresponding elements shown at the rear of the stall in Fig. 1.

The front of the stall carries a swinging stanchion gate which may comprise a rectangular frame work formed of transverse upper and lower members 11, and uprights 12, such uprights being spaced a slight distance from the vertical standards 1. One of the members 12 is hingedly mounted upon the corresponding upright 1 by means of the brackets 13, these brackets being respectively clamped upon the members 12 and 1, and suitably joined by the pintle. An intermediate transverse member 13' is carried by the members 12, and is arranged closely adjacent the upper member 11. Suitable angular braces 14 may be secured at certain corners of this gate frame work to provide the requisite stiffness. These braces may also be held by the same securing bolts 15 which tie the members 11 and 12 together. The other side of the gate is provided with a pair of latches 16 and 17 which are carried adjacent the upper and lower end of the gate. These latches may be of any desired type. Any ordinary gate latch will serve. Figure 4 illustrates one form of latch which may be employed, and it will be noted that this latch comprises a pivotally mounted jaw 20 which is locked in central position by internal locking dogs, which may be released by the rotatable controlling rod 18, thus permitting the upper and lower latches to be operated simultaneously. This latch, however, is described in detail in United States Letters Patent No. 1,538,656, issued May 19, 1925, to John B. Olson.

Stanchion bars 21 and 22 are carried by the intermediate and lower members 13' and 11 and may be provided on their inner faces with suitable contacting surfaces 23 and 24. At their lower ends they are carried by brackets 25 and 26 which may be adjustably clamped upon the member 11 in any desired position. They are, however, pivotally joined to these brackets, and at their upper ends are retained in position by means of latches 27 and 28 pivotally carried in brackets 29 and 30 respectively, which latter are adjustably mounted upon the member 13. When the animal has been led into the stall, the stanchion bars are moved until they are retained by their appropriate latches, and the animal is then in position to be engaged by other portions of the apparatus. When, however, it is desired to release the animal the stanchion bars are rocked outwardly upon their pivotal mountings. The lock is then released by operating the handle 19 to rotate the shaft or rod 18, and unlatch the catches 20, permitting the gate to be swung outwardly and allowing the animal, (assumed in the remainder of this description to be a cow), to walk forwardly out of the stall.

Chains 31 and 32 are secured to the side bar 5 upon each side of the machine, and are provided with appropriate hooks and eyes so that these chains may be fastened across the back of the animal. A chain 33 is also provided and is attached to the upright rear standards 2, and is adapted to be passed around the rear of the cow and hooked in position to prevent the cow from backing out of the stall.

A sling or girth 34 is suspended by ropes 35 from each side of the stall, such ropes being secured on each side to a drum 36 formed integrally with a sleeve 37, such sleeve and drum being mounted one upon each of the members 3. A ratchet wheel 38 is secured to the sleeve 37, and is adapted to be operated by means of a hand lever 39 thru the medium of a pawl 40 to cause such drum to rotate when the hand lever is rocked, a suitable pawl, of course, preventing unwinding motion from occurring. In this manner, either side of the girth or sling 34 may be raised independently of the other side, or else the entire girth may be raised uniformly to either maintain the cow in a standing position, or to lift her bodily from the floor. This girth 34 is the main girth, but an auxiliary one 41 may be provided, and is adapted to be attached by means of straps 42. The auxiliary girth 41 may be utilized when necessary to support the cow's udder, or it may be used as a bracing strap. Its use will depend upon the nature of the operation to be performed.

Clamps are provided upon opposite sides of the stall, and are adapted to be projected inwardly to bind upon opposite sides of the cow. These clamps comprise upper and lower horizontal members 43 and 44 which may conveniently have outwardly turned ends serving as guides. These members are joined by a vertically disposed sleeve 45 which is carried by a set of equally spaced and positioned arms 46 and 47 which are in turn mounted upon a sleeve 48, which latter is pivotally carried between the side bars 4 and 5. These clamps are adapted to be rocked inwardly, the supporting and swinging rods 46 and 47 giving the frame work a parallel motion, and are adapted to be locked in the adjusted position by means of manually releasable mechanism.

Figures 5 to 8 show details of the hinged mounting or parallel motion mounting for the side clamping frame just described. A convenient way of forming this mechanism is to provide an interior sleeve 49 which is held between suitably shaped and fitted brackets 50 and 51, the upper and lower portions of which conform to the members 44 and 43. A suitable tie rod or bolt 52 passes completely thru this mechanism, and is tightened by means of a nut 53 upon its lower end. It will be seen that the clamping pressure is not placed upon the sleeve 45, but that such sleeve freely turns upon the interior sleeve 49, while such interior sleeve is locked in a unitary manner to the members 43 and 44. A somewhat similar construction may be employed for pivotally mounting the outer ends of these swinging arms 46 and 47, as illustrated in Figure 7. In this figure, it will be seen that the fittings 54 and 55 correspond very closely to the fittings 50 and 51 just described. However, the sleeve 48 is adapted to turn upon inwardly projecting flanges 56 and 57 formed integrally with the respective fittings. These fittings are held spaced apart by means of a sleeve 58, a suitable tie rod 59 passing completely thru the structure, and being retained in tightened position by means of the nut 60. It is, of course, understood that suitable washers 61 may be provided at the upper and lower ends of the tie rods 51 and 55, such washers corresponding in contour upon their inner sides to the corresponding transverse members.

The manually releasable mechanism for locking the clamps in adjusted position comprises a vertical locking rod 62 which is provided with an operating handle 63, and is resiliently pressed downwardly by means of a spring 64, an enlarged head 65 limiting downward motion. Its upper and lower ends pass respectively thru the members 46 and 47, the lower end 66 projecting a slight distance below the lower member 47. A suitably notched segmental member 67 is clamped upon the bottom longitudinal horizontal member 4, and is so positioned that the lower end 66 of the rod 62 may be positioned in any one of the series of notches 68 so as to securely lock the swinging members in adjusted position, thereby holding the clamps in their corresponding adjusted positions.

A suitable clip 69 may be secured upon each of the uprights 2, and is adapted to receive a rope tied about the cow's tail to retain the tail in an elevated position. If desired the member 3 may be projected at both ends, and may carry rings or hooks 70 to receive any surgical instrument or dressing that may be desired.

The operation of this device is as follows:—

The gate is closed and locked and the stanchion opened. The cow is then led or driven into the stall, and her head passed thru the open stanchion. The stanchion bars are then moved into position, and are retained by the latches 27 and 28. Thereafter the chain 33 is secured in position. The chains 31 and 32 are then passed over the cow's back and hooked together. The girth 34 with its auxiliary girth 41 is then passed under the cow and secured to the drum 36 by the ropes 35. Thereafter the hand levers 39 are operated to elevate the girth sufficiently to retain the cow in a standing position, or if so desired, to lift the cow bodily upwardly, the weight of the cow being then carried by the girths.

The clamps or frames formed of the members 43 and 44 are then moved inwardly into binding relation with the sides of the cow, the manual locking means being retained in inoperative position while this adjustment is being secured. Thereafter the handles 63 are released, and the locking mechanism then operates to retain these side frames in clamping engagement.

After the operation the cow, (or other animal) may, if raised, be lowered and the side clamps retracted. The girth may then be removed, the stanchion opened, and the gate unlocked and swung to open position, allowing the animal to move forwardly out of the stall.

It is regarded as of great importance that the clamping bars 43 and 44 should be retractible, that they should move directly inwardly against the sides of the animal and be supported against lateral pressures by link members which receive and transmit lateral pressures along the lines of their own axes to the side frames of the stall. The bars 43 and 44 are so positioned and spaced as to engage the animal at the most favorable points for holding it in position without danger of injury, or interference with any ordinary operation. The links 46 and 47 are preferably of such length, that when disposed substantially at right angles to the clamping members 43 and 44, such members will engage between them an animal of normal or average size.

We claim:

1. An operating stall for animals, said stall comprising a skeleton framework, lateral clamping members pivotally linked to the respective sides of said framework for parallel movement, means for latching said members in adjusted position, a gate in the forward end of said stall, means centrally positioned within said gate and engageable with the neck of an animal positioned between said clamping members to secure said animal against forward or rearward motion, and means for supporting the body of an animal so secured, said skeleton framework being open to permit access to said animal from a wide variety of positions.

2. An operating stall for animals, comprising a skeleton framework constructed of tubular structural elements arranged to afford great accessibility to an animal within the stall, lateral clamping members each including upper and lower longitudinally disposed bars, and each mounted for parallel adjustment into contact with the sides of an animal in said stall, the bars of each clamping member being vertically spaced to contact advantageously with said animal, links pivotally supporting the clamping members from said framework, and means for locking said links with respect to said frame, whereby said clamping members may be secured in adjusted position.

3. An operating stall including an upright frame, laterally projecting arms pivoted on said frame and arranged in pairs of vertically spaced members, longitudinally disposed clamping members supported by said arms, and latch mechanism comprising a fixed tooth segment concentric with a pivot of one of said pairs of members and a latch rod movably journaled in the last mentioned pair of members and resiliently urged toward said segment for engagement with the teeth thereon, whereby said clamping members may be adjusted to a plurality of clamping positions.

4. An operating stall including a pair of upright frames each provided with longitudinally disposed bars vertically spaced apart, a lateral clamping member mounted for parallel adjustment with reference to each of said frames and including longitudinal bars vertically spaced to correspond with the longitudinal bars of said frames, and adapted to engage the body of an animal at advantageous points, and vertically adjustable means for supporting the body of an animal at a height to be properly engaged by said lateral clamping members.

5. An operating stall including a side frame having vertical posts connected at their tops by a longitudinally disposed member, and provided at substantially the height of the body of an average animal with vertically spaced horizontal bars, vertical rods connecting said horizontal bars, sleeves rotatable upon said vertical rods, inwardly projecting links attached to each sleeve, and clamping rails pivotally connected at the end of each of said links for parallel movement with respect to said frame.

6. An operating stall including a side frame having vertical posts connected at their tops by a longitudinally disposed member, and provided at substantially the height of the body of an average animal with vertically spaced horizontal bars, vertical rods connecting said horizontal bars, sleeves rotatable upon said vertical rods, inwardly projecting links attached to each sleeve, and clamping rails pivotally connected at the end of each of said links for parallel movement with respect to said frame, said rails being provided with outwardly curving extremities adapting them to be moved past the body of an animal without gouging the animal.

7. An operating stall including a side frame having vertical posts connected at their tops by a longitudinally disposed member, and provided at substantially the height of the body of an average animal with vertically spaced horizontal bars, vertical rods connecting said horizontal bars, sleeves rotatable upon said vertical rods, inwardly projecting links attached to each sleeve, clamping rails pivotally connected at the end of each of said links for parallel movement with respect to said frame, a segment secured to a portion of said frame concentrically with one of said vertical rods, and latch mechanism carried by said links and engageable adjustably with said segment.

8. An operating stall including a side frame having vertical posts connected at their tops by a longitudinally disposed member and provided at substantially the height of the body of an average animal with vertically spaced horizontal bars, vertical rods connecting said horizontal bars, sleeves rotatable upon said vertical rods, inwardly projecting links attached to each sleeve, clamping rails pivotally connected at the end of each of said links for parallel movement with respect to said frame, a girth, a drum rotatable upon said horizontal member at the top of said frame, and flexible means adapted to be wound upon said drum and secured to one end of said girth for adjusting said girth to a height suitable for cooperation with said clamping rails.

9. An operating stall comprising a pair of side frames each provided with vertical posts and longitudinally disposed bars at substantially the height of an animal's body, said bars being vertically spaced, and clamping members supported from each side frame and including horizontal rails vertically spaced at substantially the distance of said bars and adapted to engage an animal's body at advantageous points, and links pivotally supporting said clamping members from said side frames.

OTTO STADER, V. M. D.
JOHN B. OLSON.